(No Model.) 3 Sheets—Sheet 1.
T. B. ATTERBURY.
Glass Furnace.
No. 228,296. Patented June 1, 1880.
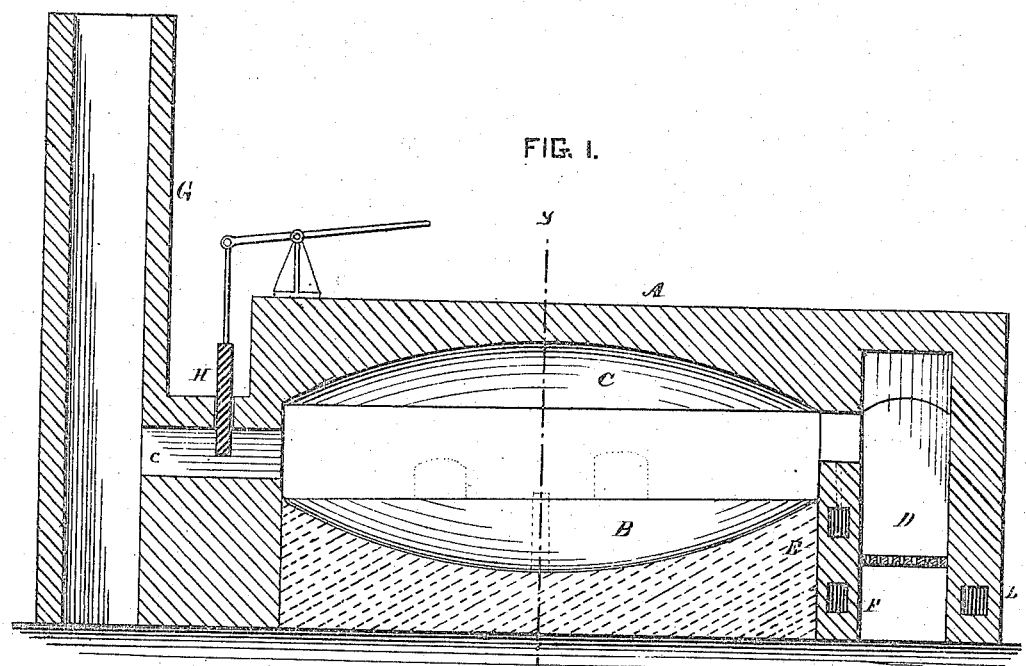
FIG. I.
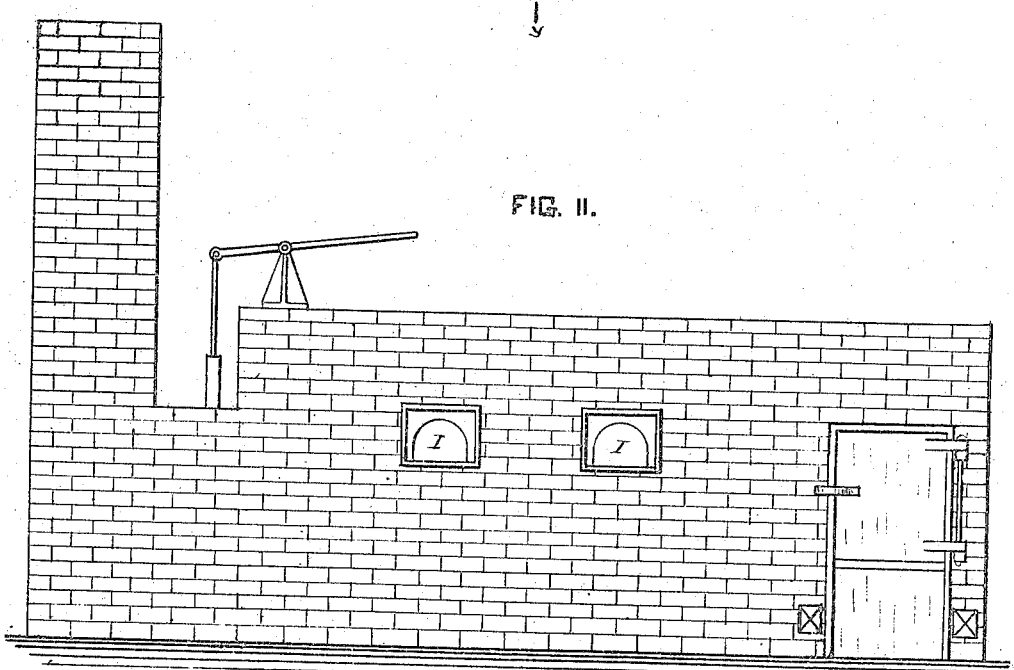
FIG. II.
WITNESSES:
Jas. S. Atterbury
D. S. Salisbury
INVENTOR:
Thomas B. Atterbury (No Model.)  3 Sheets—Sheet 2.
T. B. ATTERBURY.
Glass Furnace.
No. 228,296.  Patented June 1, 1880.
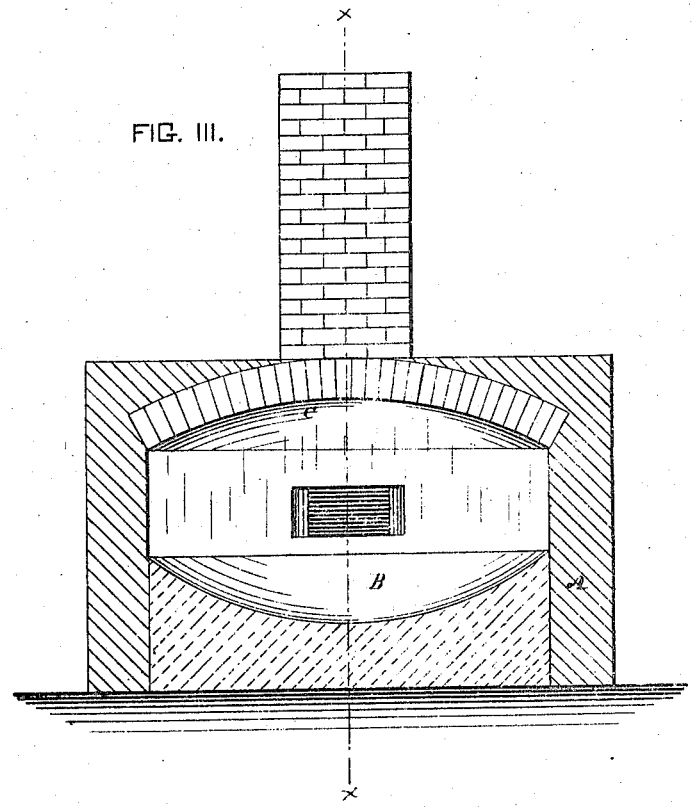
FIG. III.
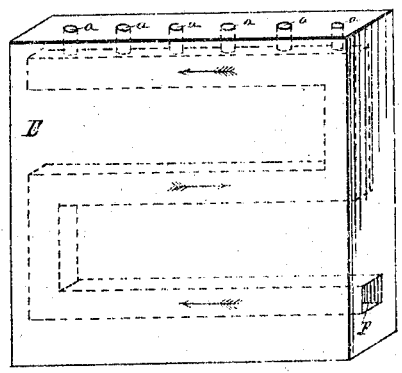
FIG. IV.
WITNESSES:
Jas. S. Atterbury.
D. S. Salisbury.
INVENTOR:
Thomas B. Atterbury.

(No Model.)  3 Sheets—Sheet 3.
T. B. ATTERBURY.
Glass Furnace.
No. 228,296. Patented June 1, 1880.
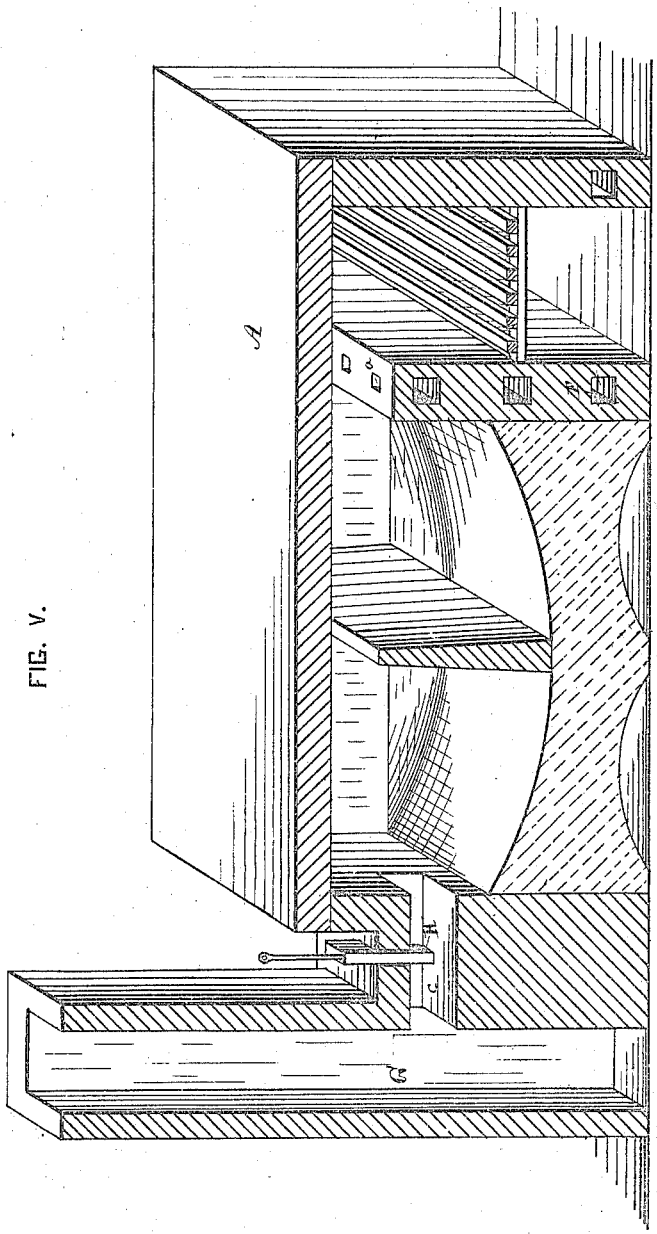
FIG. V.
WITNESSES: Jas. S. Atterbury, D. S. Salisbury
INVENTOR: Thomas B. Atterbury.

UNITED STATES PATENT OFFICE.

THOMAS B. ATTERBURY, OF PITTSBURG, PENNSYLVANIA, ASSIGNOR OF ONE-HALF OF HIS RIGHT TO JAMES SEAMAN ATTERBURY, OF SAME PLACE.

GLASS-FURNACE.

SPECIFICATION forming part of Letters Patent No. 228,296, dated June 1, 1880.

Application filed May 7, 1880. (No model.)

*To all whom it may concern:*

Be it known that I, THOMAS B. ATTERBURY, of Pittsburg, in the county of Allegheny and State of Pennsylvania, have invented a new and useful Improvement in Glass-Furnaces, of which the following is a full, clear, and exact description thereof, reference being had to the accompanying drawings, in which—

Figure I is a longitudinal vertical section on line $x\ x$, Fig. II. Fig. II is a view in perspective. Fig. III is a transverse vertical section on line $y\ y$, Fig. I. Fig. IV is a detached view, in perspective, of the fire-wall, with the air-flue shown in dotted lines. Fig. V is a longitudinal vertical section, showing a partition-wall in the melting-tank.

My improvement relates to that class of furnaces known as "tank-furnaces," in which melting-pots are dispensed with. These furnaces as heretofore constructed have been mostly used for coarse work, such as melting coarse batch for casting into plates for building and other purposes.

Attempts have been made to use the tank-furnace for finer work, such as blown and pressed ware; but they have not been successful, owing to the fact that dust and ashes come over from the fire and mingle with the batch to such an extent as to increase the cost of manufacture by spoiling so much of the work that tank-furnaces have been confined to the rough work heretofore referred to.

Tank-furnaces have also been constructed for general work in glass-making. They have been built with the tanks in several compartments—*i. e.*, a compartment for melting the batch, from which the melted glass flows under a bridge-wall or strainer into a clarifying-compartment, and thence to the working-tank, (as shown and described in the patent to C. W. and F. Siemens, No. 127,806, of July 11, 1872.)

Tank-furnaces have also been devised with separate compartments—one for melting and the other for working from, the molten glass being transferred from the melting to the working-tank by ladling, in which case tubular screens are inserted in the working-tank to keep back the floating foreign matter, (as shown and described in the patent to Ells and Deabold, No. 128,716, of July 9, 1872.)

Other and various forms of tank-furnaces have been devised; but each have proved worthless from various causes.

The object of my invention is to overcome the defects heretofore existing in this class of furnaces, and to combine in a tank-furnace the advantages of a pot-furnace; and to this end my invention consists in forming the interior of the furnace, both the crown or arch and the bottom or melting tank, of elliptical and concave form in two directions—viz., longitudinal and transverse—whereby a greater superficial area of the batch is exposed to the action of heat, and by the peculiar form of the crown or arch, a greater reverberating action of the heat is attained.

It further consists in combining with said double elliptical furnace a gas-producing furnace and air-supplying devices for producing combustion of said gas.

It also consists in certain details of construction, more fully described hereinafter.

Referring to the drawings, A designates the exterior walls of the furnace. B is the tank or melting and working compartment, and is, by preference, made of fire-clay, such as is used in the manufacture of the pots now in general use. This tank or melting-basin is concave and oval in two directions, both longitudinal and transverse, as shown. By this construction a larger surface or area of the batch is exposed to the action of the calorific currents, and as liquefaction takes place on the surface and around the edges the sloping or convex form of the basin or tank tends to hold the metal together, utilizing the heat, which would be thrown off and wasted in pots and tanks of other forms, to reduce the underlying portions of the batch to a liquid or working state. This form of tank also enables the workmen to work out the batch more completely than heretofore, owing to the concentration of the metal or melted glass at the center of the tank, directly opposite the working hole or holes, and by putting in division-plates of fire-clay or other material the compartments can be utilized for various-colored glass—i. e., two or more kinds of glass may be made in the same furnace, opal and black, clear and mottled, &c., as shown in Fig. V and in dotted lines in Fig. I.

C is the crown or arch of the furnace, which is oval in two directions, both longitudinal and transverse, so that it forms a complete counterpart of the tank B reversed.

The advantage of this construction is obvious, as a more complete reverberation of the heat is caused thereby, and all, or comparatively all, the heat utilized. This form of the crown or arch of the furnace also tends to hold the smoke and dust which is not consumed at the point of combustion until driven by the force of the draft through the throat or flue into the stack or chimney.

D is the furnace or fire-box, of ordinary construction for burning gaseous fuel, and may be provided with a dead wall or bench at the back part, so that the upper or live portion of the fire may be pushed back thereon when it is desired to free the grate-bars of clinkers, &c.

E is the back wall of the furnace or fire-box, and is provided with an air-flue, F, which traverses said wall back and forth, and finally emerges through a series of small openings, a a, at the top of the wall, where, coming in contact with the gases of the fire-box or furnace, a complete combustion takes place, which is carried forward into the melting-chamber. The front wall may also be provided with an air-flue, b, which will project sprays or jets of air into the upper portion of the fire-box or furnace. The air, by thus passing back and forth through the walls of the fire-box, is heated to a more or less extent, so that when it is mingled with the currents of gas a more complete combustion takes place.

The air-flues, and even the fire-box or furnace, may be provided with any of the ordinary blowing devices.

G is the smoke-stack or chimney, of any ordinary construction; and c, the throat or flue connecting the melting-furnace with the smoke-stack or chimney.

H i damper, of fire-clay or other suitable material, located in the flue c and operated by a chain and lever, or by any convenient device.

I are the working-holes, one or more being arranged on each side of the furnace. The holes or openings I are also used for charging the furnace with the glass batch.

The crown C of the furnace is made of fire-brick or clay, and a sheet of platinum may be used to cover the inside of the crown, to prevent the formation of "tears" or "droppings," which usually form on the arch and drop into the glass, thereby injuring it.

Air spaces or flues may be made in the top of the furnace near the crown or arch, and also under the tank, for the purpose of keeping them cool and preventing their burning out too rapidly.

The operation of my furnace is as follows, viz: The furnace is first heated to the highest point. I then introduce my batch into the tank B through the holes I. After the batch is placed in the tank the holes I are closed up with suitable stoppers of clay. The damper H is opened, air is admitted to the flues F, and the fire urged until the batch is melted. When melted and ready to work the damper is then lowered so as to close or nearly close the throat or flue c, so as to retain the heat in the melting-furnace, and thus maintain a clear white working-heat without firing up until the glass has been worked out.

I have found by practical experience that by the use of a furnace of this construction much time, labor, and expense is saved, and its superiority over the pot-furnaces now in general use is obvious to any one skilled in the art.

In the first place, the pots are expensive. It requires time, skill, and an immense amount of labor to place them in the furnace and prepare them to receive the batch. They are liable to be broken or cracked by the changes of temperature in the furnace, &c. Various other objections could be urged against their use; but by the use of a tank-furnace these objections are obviated, as they are less expensive in construction, and can be readily repaired or replaced, when worn or burned out, by any ordinary workman.

I do not wish to limit myself, in the application of my invention, to glass-furnaces exclusively, as it is evident it is equally applicable for metallurgical and other purposes.

Having thus described my invention, what I claim, and desire to secure by Letters Patent, is—

1. A melting-tank for glass furnaces, of elliptical and concave form in both its longitudinal and transverse axis, whereby a greater superficial area of the contents of the tank is exposed to the calorific currents, substantially as described.

2. A melting-tank for glass-furnaces, of elliptical and concave form in both its longitudinal and transverse axis, divided into two or more compartments, whereby two or more colors of glass can be melted and worked from the same heat, and at the same time, and from the same working hole or holes, substantially as described.

3. The crown or arch of a glass-furnace, of elliptical and concave form in both its longitudinal and transverse axis, whereby the heat from the combustion-chamber is distributed or reverberated more thoroughly over the mass to be operated upon, substantially as specified.

4. In a glass-furnace, the combination of the tank, of elliptical and concave form in both its longitudinal and transverse axis, with a crown or arch of like configuration, whereby a melting or heating compartment of spheroidal shape in outline is formed, substantially as and for the purpose set forth.

5. In a glass-furnace, the combination of the gas-producing or combustion chamber, the air-supplying tubes or flues, the elliptical and concave arch and tank, as described, with the exit-flue and damper located therein, and the working and filling holes, when constructed and arranged to operate in the manner described.

THOMAS B. ATTERBURY.

Witnesses:
JAS. S. ATTERBURY,
D. S. SALISBURY.